Oct. 1, 1968   D. GORCHEV   3,403,852
DUAL DUCT FLUID SUPPLY SYSTEM
Filed July 28, 1966   3 Sheets-Sheet 1

INVENTOR.
Dimiter Gorchev
BY
Roberts, Cushman & Grover,
ATT'YS

Oct. 1, 1968  D. GORCHEV  3,403,852
DUAL DUCT FLUID SUPPLY SYSTEM
Filed July 28, 1966  3 Sheets-Sheet 2

United States Patent Office 3,403,852
Patented Oct. 1, 1968

3,403,852
DUAL DUCT FLUID SUPPLY SYSTEM
Dimiter Gorchev, 30 Falmouth Road,
Arlington, Mass. 02174
Filed July 28, 1966, Ser. No. 568,567
9 Claims. (Cl. 236—13)

The *field* of this invention is that of regulated fluid supply systems, and the invention relates to a dual duct system utilizing valves of the type maintaining for any given setting a constant volume of fluid flow in a conduit.

In forced air heating or air conditioning systems it is desirable that the flow of air into any particular area be controlled locally, as by a thermostat. The varying demands thus placed on the system by multiple local controls may introduce substantial fluctuations of the air pressure in the supply mains. If no steps are taken to counteract these fluctuations, each local adjustment may affect the balance of the entire system, causing variations in the supply of the air to at least some of the other areas. These variations tend to be physiologically and psychologically disturbing in terms of draft and noise sensations.

In dual duct systems utilizing a hot and a cold air supply which are mixed in a desired ratio at each outlet, these problems are accentuated. For example, when one of the sources is called upon to supply substantially the full flow, areas near the source will tend to be supplied with a mixture having a higher than desired ratio of components, and areas far from the source will tend to be supplied with a mixture having a ratio far lower than desired. Since the ratio of the mixture determines its temperature, outlets near to the source will be too hot or too cold and outlets far from the source will be at the opposite temperature extreme. Furthermore, outlets near the sources, because they are at a higher pressure, will produce a large volume rate of flow of hot or cold air than outlets distant from the sources. Consequently, areas distant from the sources will take longer to heat or cool when the system is initially started.

One attempt to remedy these difficulties has been to place a constant volume valve at the outlet of the chamber in which the dual duct supplies are mixed, and to regulate the ratio of the hot and cold supplies with a damper. Such arrangements, however, do not alleviate the above-mentioned disturbances since the varying local demand causes local pressure fluctuations which in turn vary the ratio of hot and cold fluids. Thus while noise and draft fluctuations may be attenuated, temperature fluctuations will remain.

A second attempt to remedy these difficulties has been to place pressure sensitive central control devices on the main pressure supply which will, for example, regulate a main fan so as to maintain the outputs at constant pressure. Such systems, however, similarly fail to alleviate the above-mentioned disturbances since the varying local demand causes local pressure fluctuations due to the varying volume of the air being drawn through substantial lengths of duct work between the outlets and the control point. Thus the added expense of central control is largely wasted for this purpose.

*Objects* of the present invention are to provide a dual duct air supply system in which the delivery of air to any particular area can be locally controlled independently of the conditions existing in any other area; to provide such a system wherein local air supply at any particular area is not disturbed by regulation at another area; to provide such a system wherein the temperature of local air supply is not disturbed by regulation at another area; and to provide such a system which can be adapted to provide an adjustable rate of flow, variable with temperature if desired, for selective increases in the heating or cooling rates.

The *substance* of the invention can be briefly summarized as involving in its principal aspect central sources of different fluids, such as heated and cooled fluids, under pressure, which sources can be unregulated, and a plurality of independent outlet units, each unit serving a separate area to be supplied with the fluids. Each of the outlet units comprises a chamber for mixing the fluids, a first conduit connecting the mixing chamber with one fluid source, such as a heated fluid source, a second conduit connecting the mixing chamber with the other fluid source, such as a cooled fluid source, and in each of the conduits, an adjustable valve of the type which, for each adjustment position, will pass fluid at a rate that is constant over a corresponding range of differential pressures. For each area served by the unit there is an independent control device for indicating the rates at which the different, such as heated and cooled, fluids are to be supplied to the area, and means responsive to the control device for adjusting the valves to positions which correspond to the indicated rates, whereby each area is supplied with fluids at the rates and ratios indicated by its control device, without being affected by the controlled flow of fluids to other areas.

These and other objects, advantages and results of the invention and various aspects of its substance will appear from the following detailed description of several practical embodiments thereof illustrating its novel characteristics.

The *description* refers to drawings in which.

Figure 1:
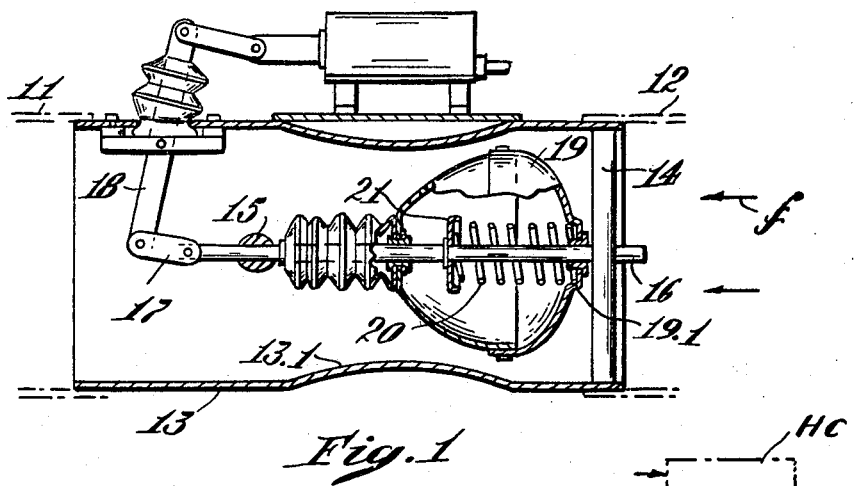
FIG. 1 is a side elevation view, partially in section, of a valve for purposes of the invention.

FIG. 1 illustrates one embodiment of a flow regulating valve which can be successfully used in the dual duct system according to this invention. This valve, and other similar suitable valves, are more fully described in the patents to Gorchev et al. 3,204,664. Briefly, the valve is shown mounted within a conduit indicated by the broken lines 11 and 12, in which fluid flow occurs between an area of relatively high fluid pressure and an area of relatively low fluid pressure in the direction indicated by the arrows *f*. As will be readily understood, the fluid flow velocity through the valve is determined by the fluid pressure differential thereacross.

The valve includes a tubular member 13 having a portion of reduced diameter 13.1 converging in the direction of fluid flow. Cross bars 14 and 15 are attached to the tubular member 13 and slidably support a shaft 16 within the tubular member. The shaft 16 is connected by a link 17 to a pivotally mounted lever 18 extending through the tubular member. Slidably mounted on the shaft 16 is a hollow, rounded plunger member 19. Within the plunger member 19 is a coil spring 20, one end of which rests against a stop 21 secured to the shaft 16, and the other end of which rests on a dished portion 19.1 of the plunger 19, thereby urging the plunger 19 in an upstream direction.

The position of the shaft 16 can be adjusted in the direction of flow by the lever 18, and for each position of the shaft 16, the valve will pass a constant volume flow of fluid. Flow of air through the valve in the direction $f$ exerts a drag on the plunger member, pushing it back against the force of the spring 20. This movement causes a contraction of the fluid passage between the plunger member and the constricted portion 13.1 of the tubular member 13. By a proper shaping of the taper of the constricted portion 13.1 with respect to the characteristics of the spring 20 and plunger 19, the valve will operate so as to pass a substantially constant volume of air for an appreciable variety of differential pressures existing across the valve. Because the position of the shaft 16 is adjustable, the valve can be set in different adjusted positions, each of which will pass fluid at a rate that is constant over a range of differential pressures.

Figure 2:
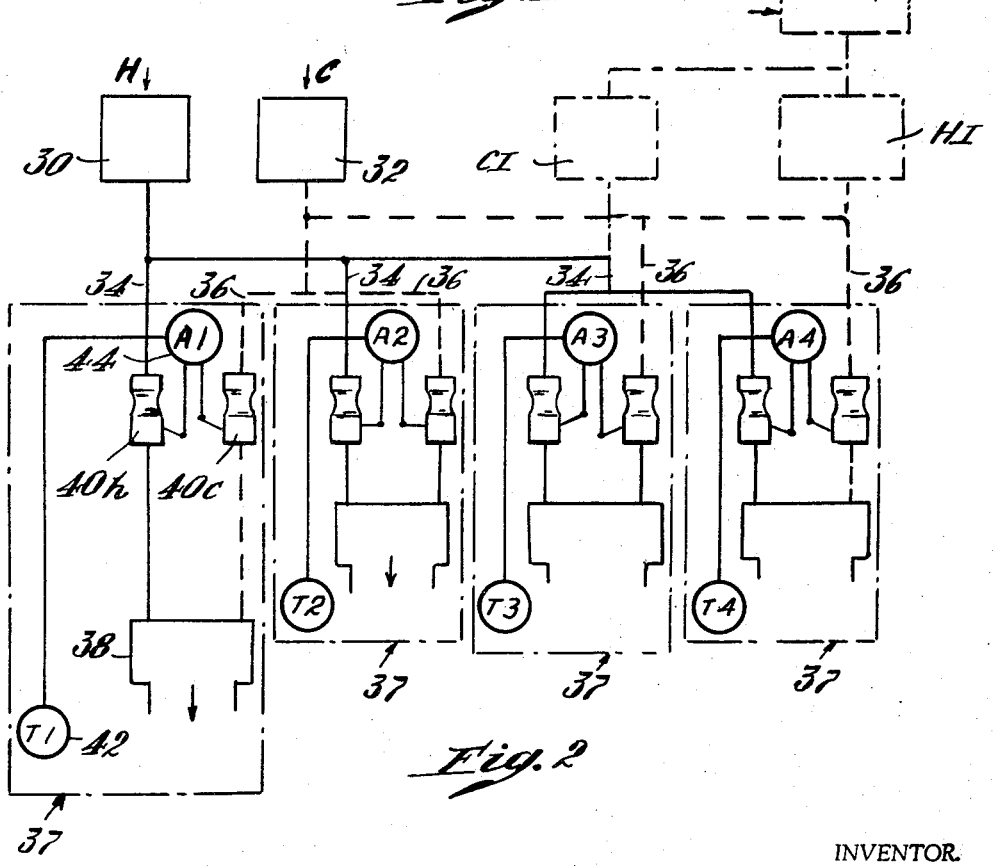
FIG. 2 is a diagrammatic illustration of a dual duct air supply system according to the invention.

An improved dual duct air supply system according to the invention in which the above described valve is particularly useful will now be described with reference to FIG. 2. Such a system finds utility, for example, in a heating and cooling air conditioning system which supplies different areas with hot and cold air mixed in a selected ratio to achieve a desired temperature and which is regulated by a thermostat.

In the system there is a source of heated fluid under pressure, such as blower 30, and a source of cooled fluid under pressure, such as blower 32, each taking in air from any conventional cooling or heating apparatus (not shown). The source of heated fluid feeds a plurality of ducts 34 (shown as solid lines) which lead to the separate areas which the system serves. Similarly, the cooled fluid source 32 feeds a plurality of ducts 36 (shown as dashed lines) which also lead to the areas to be served by the system. For each of the separate areas to be supplied with the fluids, which may be, for example, separate rooms in a building, or portions of a large room, there is an independently controlled outlet unit 37 which will now be described with regard to the system as a whole. Instead, a common intake HC of outside, return, or mixed air can be supplied to heating and cooling devices HI, CI which feed into ducts 34, 36, respectively.

Each independent outlet unit has a mixing chamber 38 in which the heated and cooled fluids are mixed to obtain a uniform-temperature, or isothermal, mixture to be supplied to the separate areas served by the unit. The ducts 34 and 36 connect the sources 30 and 32, respectively, with the mixing chamber 38. In each of the conduits 34 and 36, for each unit, there are valves 40$h$ and 40$c$, for example of the above-described type. The valves in each unit are independently controlled locally by means of control devices such as thermostats 42 so that the system provides a suitable ratio of hot and cold fluids in a suitable total amount. Adjusting means 44, responsive to the control device 42 for the unit, adjusts the valves to positions which correspond to the rates indicated by the control device in the manner described below.

Because the valves 40$h$ and 40$c$ are of the type which, for each adjustment position, will pass fluid at a rate that is constant over a corresponding range of differential pressures, it can be readily seen that local fluctuations in pressure caused by adjustments elsewhere in the system will not affect either the ratio of heated and cooled fluid or the total amount of fluid delivered by each unit. Accordingly, each unit will deliver a mixture of fluid at the temperature determined by the control means 42, completely independently of variations in other parts of the system, even in situations in which one or the other of the source is called upon to supply its maximum output.

The system as described has additional advantages. For example, the valves and adjusting means may be located remote from the mixing chamber and outlet of the unit, as indicated at the left of FIG. 2. This permits, for example, the valves and adjusting means to be located where they can be easily serviced and maintained, as in a wall, while the mixing chamber and outlet may be placed in a ceiling of a room. Utilization of the described system thus permits increased flexibility in building design and duct work location. In addition, the adjusting means 44 in each unit can be selected to provide flexibility and selectivity in the total output flow of the unit, which will be more fully described with reference to the following practical embodiments of several output units according to the invention.

Figure 3:
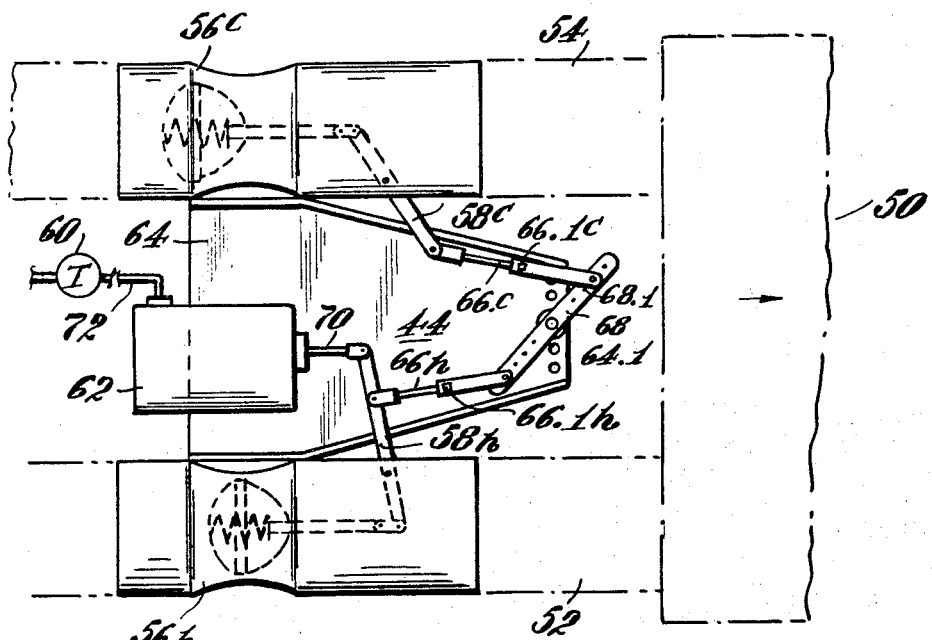
FIG. 3 is a side elevation view, partially in section, of an independent outlet unit according to the invention.

FIG. 3 illustrates one practical embodiment of the above-described independent outlet unit. A mixing chamber 50, which can be of conventional design, is connected with the heated and cooled fluid ducts by substantially parallel conduits 52 and 54. Adjustable constant volume valves 56$h$ and 56$c$, shown as being of different sizes and of the type described with reference to FIG. 1, are located in the conduits. The valves are adjusted to provide different constant volume rates of flow by levers 58$h$ and 58$c$ pivotally mounted on the respective valves and extending therefrom. The valves are simultaneously adjusted in response to a thermostatic control device 60 by adjusting means with a mechanical linkage operated by a motor 62. The linkage and motor are supported by a plate 64 secured to the valves. As shown, the linkage comprises a pair of first arms 66$h$ and 66$c$ pivotally connected at one end to the levers 58$h$ and 58$c$ respectively. The arms 66$h$ and 66$c$ are preferably adjustable in length, being provided with set screws 66.1$h$ and 66.1$c$ to secure them at a selected length. At their other ends the arms 66$h$ and 66$c$ are pivotally connected to a link 68 which is pivotally mounted at a point between the arms on the plate 64. Preferably, both the link 68 and the plate 64 are provided with several mounting locations, represented by the several holes 60.1 and 69.1 shown in the drawing. It can be readily appreciated that the valves 56$h$ and 56$c$ can be adjusted for defining different rates to obtain a variable total output flow by varying the length of the arms 66$h$ and 66$c$; by varying the point of connection of the arms to the link 68; and by varying the point of connection of the link to the plate 64.

The linkage is operated, as previously explained, by motor 62 mounted on the plate 64. The motor 62 is shown as having an extensible member 70 pivotally connected to the lever 58$h$. However, the motor could as well be connected to the linkage at a number of other points therein. The motor 62 can be a pneumatic motor, for example, which extends or retracts the member 70 in accordance wth variations in pressure in a supply line 72. The thermostatic control device 60 can then be one which has a constant pressure input from a constant pressure source (not shown), and a variable pressure output to the supply line 72. Alternatively, the motor 62 and control device 60 could be electrically operated.

Figure 4:
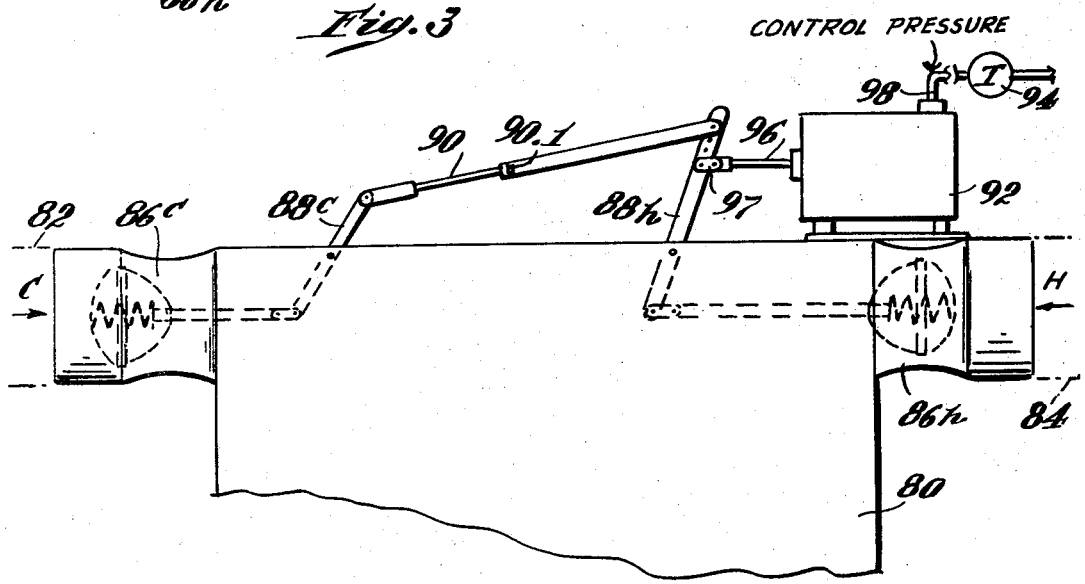
FIG. 4 is a side elevation view, partially in section, of another embodiment of the outlet unit according to the invention.

FIG. 4 illustrates a second embodiment of the outlet unit. In this embodiment, a mixing chamber 80 is connected with the sources of heated and cooled fluid by substantially colinear conduits 82 and 84. In the conduits and attached to the mixing chamber are adjustable constant volume valves 86$h$ and 86$c$ which are adjusted by levers 88$h$ and 88$c$ pivotally mounted on the mixing chamber. The levers are linked by an arm 90, preferably adjustable in length and secured at a selected length by set screw 90.1. A motor 92 controlled by a thermostatic control device 94 is supported by the mixing chamber and one of the valves and has an extensible member 96 pivotally connected by link 97 to one of the levers 88$h$ or 88$c$. The lever 88$h$, shown connected to the extensible member 96, is provided with multiple connecting points, represented by the holes shown therein. As before, the motor 92 can be a pneumatic motor which extends or contracts the member 96 in accordance with variations in pressure in the supply line 98, and the thermostatic control device 94 can be one supplied with a constant pressure input and a variable pressure output to the supply line 98. Variable rates of adjustment of the valves and a variable total output flow can be obtained by changing the connecting points of either the arm 90 or the extensible member 96 to the lever 88h.

Figure 5:
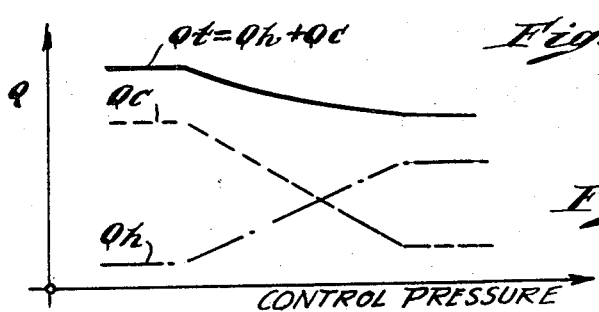
FIG. 5 is a graph illustrating the operation of outlet units such as according to FIGS. 3 and 4 [FIG. 6], as improved according to the invention.

FIG. 5 illustrates an example of the flow characteristics attainable with the outlet units of FIG. 3 or 4. In FIG. 5, $Q_h$ represents the volume rate of flow of heated fluid through the valves 56h or 86h; $Q_c$ represents the volume rate of flow of cooled fluid through the valves 56c or 86c; and $Q_t$ represents the total output flow from the mixing chamber, which is equal to $Q_h + Q_c$.

The independent variable is taken as the control pressure in the supply lines 72 or 98, which is related to the temperature of the total output flow. As previously explained, the rates of adjustment of the valves can be different, and in the example graphically shown in FIG. 5, it is readily apparent that by giving $Q_c$ and $Q_h$ different rates of adjustment it is possible to vary the total output flow of the unit. In the specific example illustrated, output flow is highest at the colder temperatures and lowest at the hottest temperatures. This situation is one frequently desired in practice because it is easier to heat air to a much higher than room temperature than to cool it much lower than the room temperature. It should be readily appreciated, however, that the units of FIGS. 3 and 4 can be made to provide other characteristics. For example, a constant total output flow may be desired, in which case $Q_c$ and $Q_h$ are adjusted so that they change equally with variations in control pressure.

The flat portions of the $Q_c$ and $Q_h$ curves shown are easily provided by limiting the extent of movement of the extensible members 70 or 96 by means of stops or the like.

It will be evident that the units shown in FIGS. 3 and 4 can be constructed and adjusted at a factory to produce the desired flow characteristics, and no cumbersome and difficult adjustments need be made in the field when the unit is installed. These advantages, in addition to those previously recited, render the system composed of the above described units very easy and inexpensive to install and easy to maintain, and capable of a wide variety of applications.

Figure 6:
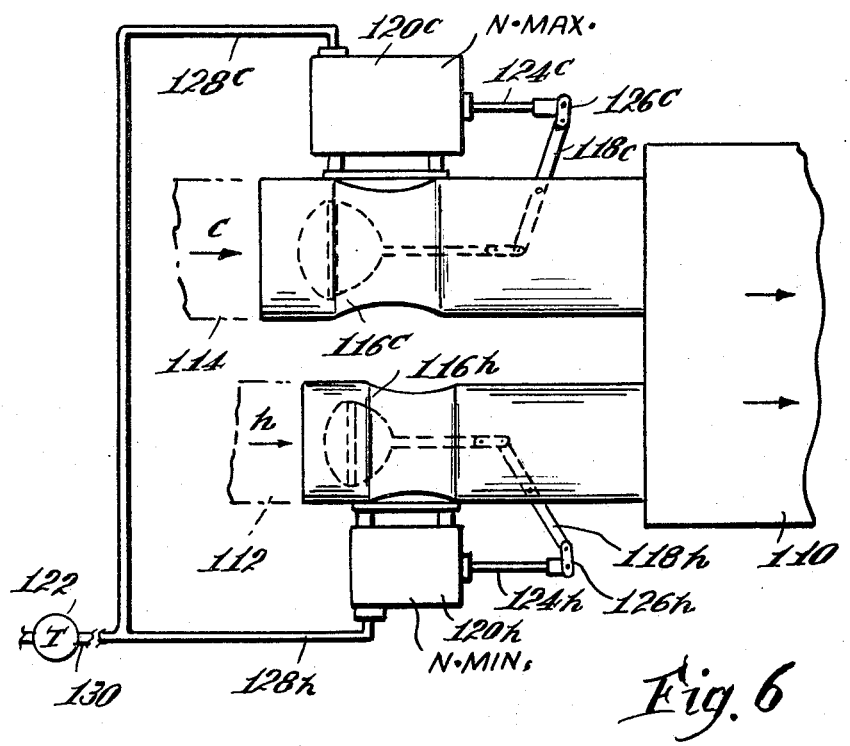
FIG. 6 is a side view partially in section, of an outlet unit according to the invention.

A further embodiment of the outlet unit according to the invention is illustrated in FIG. 6. In this embodiment, a mixing chamber 110 is connected with the sources of heated and cooled fluid by conduits 112 and 114. In the conduits are valves 116h and 116c, each of which is an adjustable constant volume valve preferably of the type above described. The valves are adjusted by means of levers 118h and 118c, respectively, pivotally mounted on the valves. Mounted on the valves are motors 120h and 120c each of which is independently responsive to a thermostatic control device 122. The motors have extensible members 124h and 124c which are fastened to the levers 118h and 118c by means of connector links 126h and 126c respectively. As in the previously described embodiments, the motors can be pneumatic motors of the type which extend or retract the members 124h and 124c in response to variations in the pressures in their respective supply lines 128h and 128c. The thermostatic control device 22 can be of the type which has a constant pressure input (not shown) and a variable pressure output to a line 130 connected to both of the supply lines 128h and 128c. By constructing the motors 120h and 120c so that they respond over different pressure ranges, with different rates of extension of the members 124h and 124c, or by varying the lengths or pivot points of the levers 118h and 118c, or by providing different sized valves, or by a combination of these expedients, it is possible to achieve great flexibility in the flow characteristics of the unit.

Figure 7:
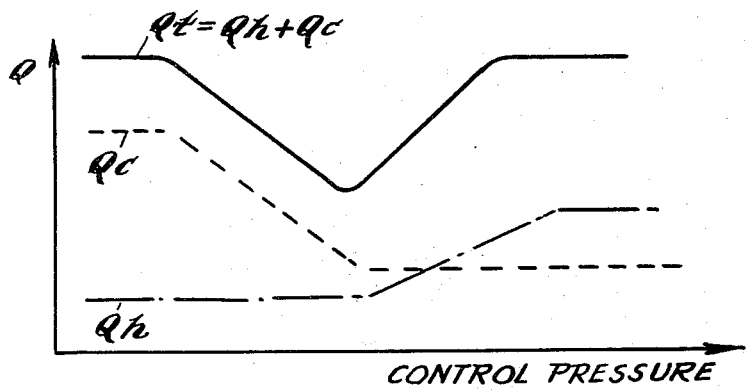
FIG. 7 is a graph illustrating the operation of outlet units such as according to FIGS. 3 and 4 [FIG. 6], as improved according to the invention.

An example of the flow characteristics which may be obtained with units according to FIG. 6 is shown in FIG. 7. In this graph, $Q_c$ and $Q_h$ represent the heated and cooled fluid flows respectively, and $Q_t$ represents the sum of these flows. The independent variable is taken as the control pressure in the supply lines 128h and 128c. It is seen that by constructing the motors so that they respond over different pressure ranges as shown, the total flow characteristics shown in FIG. 7 can be obtained. Such a flow, having a central minimum point and increasing toward either temperature extreme, can be extremely useful in practice. If the central minimum is made to occur at a temperature desired for steady state operation, for example 70° for office buildings, then it can be readily seen that increased flow at temperatures higher or lower than this desired temperature will cause the area served by the unit to more quickly reach the desired temperature, while reducing the steady-state demand on the sources. A further advantage of the flow characteristic illustrated in FIG. 7 is that temperature control is accomplished essentially by manipulation of only one valve. For example, in winter, the flow of cooled fluid will be essentially constant and temperature variations will occur by varying the flow of heated fluid. In summer, the converse situation prevails. Thus, advantage can be taken of the diversity factor which is due to various external and internal circumstances requiring heating or cooling corresponding to these varying conditions. For example, a given exposure of the building which is sunlit will get maximum cold air while the shaded areas will receive minimum cold air. When the load requirements change due to shifting of the sun, the volume of cold air will be increased in the sunlit areas and decreased in the shaded areas. The central equipment for that reason can be made smaller in size than if constant volume were supplied to all areas. This permits considerable saving in energy supply for heating as well as cooling equipment, size of ducts, auxiliary equipment and building space. The flow characteristic of FIG. 7 is merely exemplary however, and the unit can be constructed or adjusted to provide a large variety of flow characteristics, such as constant total output flow or a linearly varying output flow.

The following practical example will serve to illustrate the operation of the invention in further detail with reference to the modification according to FIGS. 3 to 5. Taking the maximum of the desired output flow ($Q_t$) as 100% air flow, the adjusting means are set so that the hot valves 56h or 86h deliver from 20% to 60% of the air flow, the hot flow ($Q_h$) increasing as the control pressure in lines 72 or 98 increases over a specified range of values. The cold valves are set to deliver from 80% to 30% of flow, this cold flow ($Q_c$) decreasing as the control pressure increases over the aforesaid specified range of values. Stops or the like are placed on the motors 62 or 92 or on the linkages, so that the flows from the valves will remain constant at these percentage limits when the control pressure is above or below the aforesaid specified range of values. It will be evident that by not requiring the valves to pass more than 80% and 60% of the maximum desired flow, these valves and their ductwork can be made smaller than if they were required to pass the full 100%. The output flow $Q_t$ thus varies from 100% to 90% as the control pressure increases over the specified range of control pressures, remaining constant at 100% and 90% when the control pressure is beneath or above this range. The ratio of cold flow ($Q_c$) to hot flow ($Q_h$) varies in this range from 4 to ½, producing a corresponding variation in the temperature of the total flow issuing from the mixing chambers 50 or 80. Outside the specified control pressure range, the ratios of flow and the temperatures of the mixture are constant.

Another practical example will serve to illustrate the operation of the invention as incorporated in the modification according to FIGS. 6 and 7. Again taking the maximum of the desired air flow as 100%, the adjusting means are set so that the hot valve 116h delivers from 20% to 60% of the air flow, this hot flow ($Q_h$) increasing within a specified control pressure range and staying constant outside of that range. The cold valve 116c is set to deliver from 80% to 30% of the air flow, this cold flow ($Q_c$) decreasing in, and remaining constant outside of, a control pressure range for which hot flow ($Q_h$) is constant at its 20% value. Thus, the total flow ($Q_t$), at lowest control pressures, has a constant value of 100%. As control pressure is increased, the cold flow decreases, and the total flow reduces to 50%, its minimum value. As control pressure is increased further, the hot flow begins to increase, and the total flow rises to 90%, remaining constant at this value if the control pressure is further increased. The ratio of cold flow to hot flow varies from 4 to ½, producing a corresponding variation in the temperature of the total flow issuing from the mixing chamber 110.

I claim:
1. In a fluid supply system comprising a first source of fluid and a second source of fluid, both fluids under pressure; and a plurality of independent outlet units, each unit serving a separate area to be supplied with the fluids, and each unit including: a chamber for mixing the fluids, a first conduit connecting the mixing chamber with the first fluid source, and a second conduit connecting the mixing chamber with the second fluid source;
the improvement which comprises:
in each of the conduits an adjustable valve of known type which, for each adjustment position, will pass fluid at a rate that is constant over a corresponding range of differential pressures;
an independent control device for the area served by the unit, for indicating the rates at which the fluids are to be supplied to that area; and
means responsive to the control device for adjusting the valves to respective positions supplying fluids at rates which correspond to the indicated rates and hence varying ratios of mixture;
whereby each area is supplied with fluids at the rates and ratios demanded by its control device, without being affected by the controlled flow of fluids to other areas.

2. System according to claim 1 wherein the adjusting means for each unit includes:
mechanical linkage means coupled to the valves for simultaneously changing the adjustment positions of the valves; and
motor means responsive to the control device for adjusting the linkage means to a position which corresponds to the indicated rates.

3. System according to claim 2 wherein the conduits enter the mixing chamber codirectionally and the linkage means are pivotally coupled to respective valves for adjustment in opposite directions.

4. System according to claim 2 wherein the conduits enter the mixing chamber in opposite directions and the linkage means are pivotally coupled to respective valves for codirectional adjustment.

5. System according to claim 2 wherein the linkage means includes pivotally connected levers with arms of adjustable length.

6. System according to claim 1 wherein the adjusting means for each unit includes:
a first motor means connected to one of the valves and responsive to the control device for adjusting its valve to a position which corresponds to the indicated rate; and
a second motor means connected to the other of the valves and responsive to the control device for adjusting its valve to a position which corresponds to the indicated rate;
whereby the adjustment positions of the valves can be independently changed.

7. In a dual duct system for supplying temperature conditioned air to various areas comprising a central unregulated source of heated air under pressure; a central unregulated source of cooled air under pressure; and a plurality of independent outlet units, one for each of the areas, each unit including: a chamber for mixing the heated air and the cooled air, a first conduit connecting the mixing chamber with the heated air source, and a second conduit connecting the mixing chamber with the cooled air source;
the improvement which comprises:
in each of the conduits, an adjustable valve of known type which, for each adjustment position, will pass fluid at a rate that is constant over a corresponding range of differential pressures;
an independent thermostatic control device for indicating the volumes of heated and cooled air that are to be supplied to the area; and
motor means responsive to the thermostatic control device for adjusting the valves to positions which correspond to the indicated volumes of air;
whereby each area is supplied with the volumes of heated and cooled air indicated by its control device.

8. System according to claim 7 wherein the motor means is a single motor and which further comprises mechanical linkage means coupled to the valves for simultaneously changing the adjustment positions of the valves.

9. System according to claim 7 wherein the motor means includes two motors connected to respective valves and responsive to the thermostatic control device for changing the adjustment positions of the valves.

References Cited
UNITED STATES PATENTS

| | | | |
|---|---|---|---|
| 2,890,717 | 6/1959 | Werder | 137—521 |
| 2,991,937 | 7/1961 | Bottorf et al. | 236—13 |
| 3,227,369 | 1/1966 | Leemhuis | 236—13 |

ROBERT A. O'LEARY, *Primary Examiner.*

W. E. WAYNER, *Assistant Examiner.*